United States Patent
Carlson et al.

(10) Patent No.: US 11,607,628 B2
(45) Date of Patent: Mar. 21, 2023

(54) SYSTEMS AND PROCESSES FOR AUTOMATED SAND SEPARATION

(71) Applicant: CHEVRON U.S.A. Inc., San Ramon, CA (US)

(72) Inventors: Koby Byron Carlson, San Ramon, CA (US); Matthew Allen Kieke, San Ramon, CA (US); Shawn Marshall Woodard, San Ramon, CA (US); Kenneth Paul Hagar, San Ramon, CA (US)

(73) Assignee: CHEVRON U.S.A. Inc., San Ramon, CA (US)

( * ) Notice: Subject to any disclaimer, the term of this patent is extended or adjusted under 35 U.S.C. 154(b) by 720 days.

(21) Appl. No.: 16/573,723

(22) Filed: Sep. 17, 2019

(65) Prior Publication Data

US 2021/0077923 A1 Mar. 18, 2021

(51) Int. Cl.
*B01D 21/30* (2006.01)
*B01D 21/00* (2006.01)
*E21B 43/34* (2006.01)
*B01D 21/24* (2006.01)
*E21B 21/06* (2006.01)

(52) U.S. Cl.
CPC ....... *B01D 21/302* (2013.01); *B01D 21/0024* (2013.01); *B01D 21/2483* (2013.01); *E21B 21/065* (2013.01); *E21B 43/34* (2013.01); *E21B 43/35* (2020.05)

(58) Field of Classification Search
CPC ............ B01D 21/0024; B01D 21/0093; B01D 21/245; B01D 21/2483; B01D 21/302; E21B 21/065; E21B 21/066; E21B 43/34; E21B 43/35

USPC .................. 210/86, 104, 112, 113, 533, 803; 166/75.12

See application file for complete search history.

(56) References Cited

U.S. PATENT DOCUMENTS

| | | | |
|---|---|---|---|
| 4,348,279 A * | 9/1982 | Tikhonov | B01D 21/302 210/113 |
| 6,009,892 A * | 1/2000 | Martinitz | B01D 21/0024 137/208 |
| 6,672,335 B1 | 1/2004 | Welborn | |
| 6,790,367 B2 | 9/2004 | Schmigel et al. | |
| 8,424,599 B2 | 4/2013 | Atencio | |
| 8,585,893 B2 * | 11/2013 | Arefjord | B01D 21/267 210/113 |
| 9,091,160 B2 | 7/2015 | Renick et al. | |
| 10,385,635 B1 * | 8/2019 | Tucker | E21B 43/34 |

(Continued)

*Primary Examiner* — Christopher Upton
(74) *Attorney, Agent, or Firm* — Hunton Andrews Kurth LLP (57) ABSTRACT

A sand handling system having, for example, one to three sand separators are configured to be operatively connected to a well and an inlet of a common dumping vessel. Advantageously, the dumping vessel has a sensor to measure an amount of sand in the dumping vessel and provide a signal to a programmable controller which is arranged to dump the dumping vessel when a specified amount of sand is in the dumping vessel. The system automates the sand handling process and also measures and records data associated with a number of flowback parameters. The data can then be used in well design to improve oil and/or gas production, lessen sand production, reduce well damage and/or equipment corrosion due to, for example, sand.

19 Claims, 5 Drawing Sheets

Typical Application (56) References Cited

U.S. PATENT DOCUMENTS

| | | | |
|---|---|---|---|
| 2006/0070735 A1* | 4/2006 | Guerra | E21B 43/34 |
| | | | 166/75.12 |
| 2011/0036239 A1* | 2/2011 | Sarshar | B01D 21/0012 |
| | | | 96/216 |
| 2012/0211442 A1* | 8/2012 | Lange | E21B 21/066 |
| | | | 210/512.1 |
| 2014/0318644 A1* | 10/2014 | Hollingsæter | E21B 21/065 |
| | | | 137/546 |
| 2014/0345727 A1 | 11/2014 | Gilmore et al. | |
| 2019/0366242 A1* | 12/2019 | McNaughton | E21B 43/34 |
| 2020/0155975 A1* | 5/2020 | Hickie | B01D 21/267 |

* cited by examiner

Sand Dumping and Measurement Device

Fig. 3

Operator Interface

SYSTEMS AND PROCESSES FOR AUTOMATED SAND SEPARATION

FIELD OF THE INVENTION

The present invention relates generally to a mobile sand handling system and process for automated separation, management, and storage of particulates such as fracking sand.

BACKGROUND AND SUMMARY

Sand is typically produced from an oil and gas well for some time before the well enters a production phase. Typically, sand is separated from other flowback components, e.g., water and other fluids, with a sand separator. The sand may or may not be manually weighed before hauling it away from the wellsite. Unfortunately, such systems are labor intensive and inaccurate as to amount of sand flowback and other parameters. What is needed is an improved sand handling system that minimizes operating expenses and labor required and improves upon the drawbacks of prior art systems and processes.

Advantageously, the present invention solves those issues and has additional advantages that may lead to improved oil and/or gas production, less sand production, reduced well damage, and/or reduced well and equipment corrosion due to, for example, sand. The system automates much of the sand handling and automatically measures and records data associated with a number of flowback parameters. The recorded data may then be used in well design and planning leading to one or more of the aforementioned or even other advantages.

In one embodiment the invention pertains to a sand handling system which comprises a sand separator configured to be operatively connected to a well and an inlet of a dumping vessel. A valve may be between the sand separator and the inlet of the dumping vessel. The system comprises a sensor to measure an amount of sand in the dumping vessel and a programmable controller. The controller is arranged to open and close the valve and is also arranged to dump the automated dumping vessel when a specified amount of sand is in the vessel.

In another embodiment the invention may be a mobile trailer with a first and second sand handling system with a programmable controller. That is, the mobile trailer comprises two or more sand handling systems. A first sand handling system is configurable to operate with a first well, three sand separators, and a first dumping vessel. The first dumping vessel comprises a first sensor to measure an amount of sand in the first dumping vessel. A second sand handling system is configurable to operate with a second well, three different sand separators, and a second dumping vessel. The second dumping vessel comprises a second sensor to measure an amount of sand in the second dumping vessel. A programmable controller is configured or configurable to dump the first dumping vessel when a specified amount of sand is in the first dumping vessel and configured or configurable to dump the second dumping vessel when a specified amount of sand is in the second dumping vessel. Each of the first and second sand handling system comprises three valves wherein each valve is configured or configurable to be associated with a different one of the three sand separators. Each valve is operably connected or configurable to be controlled by the programmable controller. The mobile trailer may comprise one or two chokes operably connected or configurable to be associated with the three sand separators and operably connected or configurable to be controlled by the programmable controller.

In another embodiment the invention pertains to a method of automated sand separation. The method comprises providing flowback from an oil and gas well through a series of three sand separators operably connected to a programmable controller. The three sand separators are operably connected to an inlet of a dumping vessel. The dumping vessel comprises a sensor to measure an amount of sand in the dumping vessel. The sensor is operably connected to a programmable controller. At least a portion of said flowback from said series of three sand separators is then provided to the inlet of the dumping vessel. The flow of the flowback is controlled through the series of three sand separators, through any valves or chokes, and to the inlet of the dumping vessel with the programmable controller. The programmable controller is arranged to automatically dump the vessel when a specified amount of sand is in the automatic dumping vessel.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate preferred embodiments of this invention, and are therefore not to be considered limiting of its scope, for the invention may admit to other equally effective embodiments that vary only in detail. In the drawings.

DESCRIPTION OF THE PREFERRED EMBODIMENTS

Certain terms are used throughout the following description and claims to refer to particular system components. As one skilled in the art will appreciate, different companies may refer to a component by different names. This document does not intend to distinguish between components that differ in name but not function.

General Sand Handling Systems

The sand handling systems of the present invention may be configured in any convenient manner and such manners may vary depending on the type of well and its characteristics, desired results, and available equipment and the like. The systems are usually employed during sand flowback which is generally after well completion but prior to production. Typically, the system has at least one, two, or three sand separators that are each operatively connected to a well and an inlet of a dumping vessel.

The sand separator employed may be any convenient sand separator and many are known in the art and commercially available. Such sand separators include gravity separators and centrifugal or hydrocyclone separators. The type of separator or separators employed may be selected depending on factors such as flowback conditions and amount and type of sand. In some embodiments there are two, three, or even four or more separators employed for the same well. Generally, when two or more separators are employed for a given well the separators are connected in series although there may be situations when a parallel connection is desired.

Typically, there is at least one valve that is located between the sand separator and the inlet of the dumping vessel. There also may be a choke between the valve and the inlet of the dumping vessel. The valve or valves and the choke or chokes are usually controlled by the programmable controller to be open and closed and, in the case of a choke potentially throttled. The specific type of valve is not critical so long as it can handle the pressures employed and be configured to be opened and closed with the programmable controller. Of course, the valve and choke, if present, also can optionally be opened and closed manually in the event of, for example, a malfunction of the programmable controller. In one embodiment the valve is an electrically actuated valve.

The dumping vessel employed typically has an inlet to receive flowback from the sand separator to which it is operatively connected. The inlet may be a pipe or the inlet may simply be an opening on top of the vessel. The dumping vessel comprises a sensor to measure an amount of sand in the dumping vessel. The sensor is configured to communicate with the programmable controller in a convenient manner that may include a wired or wireless communication. In this manner the sensor may communicate with the programmable controller which is arranged to dump the vessel when a specified amount of sand is in the vessel. The sensor may measure the volume of sand in the dumping vessel, the weight of the sand in the dumping vessel, or both the volume and the weight. Such sensors include, for example, a scale, a load cell, or combinations thereof and may also comprise integral or external wireless or wired communication to, for example, the programmable controller or other components.

As used herein the dumping vessel is one that automatically dumps upon being instructed to do so by the programmable controller. The instruction typically is sent by the controller when the vessel sensor determines that it has reached the specified amount of sand and communicates that condition to the controller. The automated dumping of the dumping vessel may be accomplished in any convenient manner. In one embodiment, the vessel has an actuator, hydraulic or otherwise, that upon instruction from the controller automatically tips the vessel to dump it into, for example, a pit, a frac tank, or any other desired location. In another embodiment, the vessel may have a releasable bottom that may slide to allow the sand to exit. In yet another embodiment, the vessel may have an air ejection or other mechanism to dump the sand from the dumping vessel. In another embodiment the dumping vessel may comprise or be a backwashable or other filter such that the sand may be dumped from the filter via a washing step such as backwashing or some other convenient manner of removal.

The size, shape, and material of the dumping vessel may vary depending upon the configuration of the rest of the system. The size should generally be large enough to accommodate sand received from one to three or even up to four sand separators without having to dump too frequently. The vessel may take the form of any shape which may be, for example, a sphere, cylinder, cone, square or perhaps a rectangular box, etc. The material of which the vessel is made should be sufficient to handle the weight and pressure of the flowback materials and thus the vessel is typically comprised of an available metal or alloy such as steel.

The programmable controller is typically arranged to open and close valves and chokes within the system and may be located near the valves and chokes or remotely. The controller also is arranged to automatically dump the vessel when a specified amount of sand is in the vessel as determined by the sensor which is in communication with the controller. The programmable controller may be any convenient controller and may be powered in any convenient manner, e.g., electricity, battery, solar, or otherwise. The programmable controller or another component of the system may be configured to track or store in memory one or more parameters selected from the group consisting of sand production over time, total weight of sand dumped, total volume of sand dumped, sand production by each sand separator, flowback rates, flowback volumes, various pressures such as wellbore pressure and/or surface pressure, production choke position, sand dump choke position, and combinations thereof. Additional parameters may include, for example, well test, oil amount, water amount, gas amount, well casing pressure, intermediate casing pressure, tubing pressure, flow line pressure, and combinations thereof. By recording and analyzing such parameters one may optimize sand strategy for the well in question or future wells with similar or different characteristics. As one example an understanding of the sand dump choke position assists in knowing the choke wear and/or other erosion in the system such that parameters may be adjusted to reduce choke wear and choke replacement. That is, if the choke has to be more open then it may indicate choke wear and/or erosion.

In some embodiments the system comprises a second sand separator operatively connected to the same well as the first separator and the same inlet of the same dumping vessel or in some embodiments the second separator may be operatively connected to a second dumping vessel. That is, typically, the second sand separator is connected to the same dumping vessel as the first sand separator and may be connected though the same inlet as the first sand separator or alternatively may be connected though a second separate inlet on the dumping vessel. Generally, there is a second valve between the second sand separator and the inlet of the dumping vessel which is connected to the second sand separator. There may also be a second choke located between the valve and the same inlet. Usually the programmable controller is arranged to open and close the second valve and any second choke, if present.

If desired, at least portions of the system, for example, valves, chokes, and programmable controller may be mounted on a skid. Alternative embodiments include, for example, portions of a system such as the above or below mentioned systems mounted on a mobile trailed as described in more detail below.

Mobile Trailer Embodiments

In another embodiment at least a portion of the automated sand dumping system may be mounted on a mobile trailer. In this manner the trailer may be moved from well to well or from a series of two or three or more wells in one location to another series of two or three or more wells in another location after sand flowback is complete for a given well or group of wells. In one embodiment, the trailer may comprise one, two, or three, or more sand handling systems.

Typically, each sand handling system is configurable to operate with a given well and comprises three sand separators and one dumping vessel. As described above, the first dumping vessel may comprise a first sensor to measure an amount of sand in the first dumping vessel. A second and/or third sand handling system may be configurable to operate with a second and/or third well and sensors along with three different sand separators for each of the second and third well. In addition, a second dumping vessel comprising a second sensor to measure an amount of sand in the second dumping vessel may be configured to operate with the second sand handing system with three sand separators. Similarly, if a third or more sand handing system is employed then it may operate similarly or differently depending upon the desired configuration and results.

Each of the one, two, or three or more sand handling systems may configured to be operably connected separately or together to a programmable controller. In this manner each may be configured to dump an associated dumping vessel when a specified amount of sand is in the associated dumping vessel. Any portion or even the entire system may be located on the mobile trailer. Preferably, the mobile trailer may comprise a portion of each of the first and second and/or third sand handling system while the one or more, two, or three or more sand separators associated with a first, second, and/or third well are not located on the mobile trailer, but instead, are located remotely. Similarly, one or more associated dumping vessels associated with the first, second, and/or third well may be located remotely from the mobile trailer along with their associated pits or frac tanks into which sand may be dumped. Thus, it is preferable that the mobile trailer comprise the valves, chokes, and programmable controller configured such that they may operably connect to the sand separators and automated dumping vessels associated with one, two or three wells. Preferably, each well has three sand separators connected in series employing the valves, chokes, and programmable controller on the mobile trailer and an associated dumping vessel that will be shared by the three sand separators.

Preferably a mobile trailer may encompass the valves and/or chokes to be associated with one, or two, or three or more wells along with the programmable controller for the same and any associated dumping vessels. That is, a mobile trailer may comprise or include sand handling systems wherein associated separators and/or dumping vessels are not on the trailer. A sand handling system on the trailer may comprise three valves wherein each valve is configurable to be associated with a different sand separator. Moreover, each valve may operably connected to be controlled by the programmable controller. The first and second and third sand handling system that may be on the trailer may comprise an associated choke or two. Each choke may be configurable to be associated with sand separators and also may be operably connected to be controlled by the programmable controller. Of course, if desired and if the mobile trailer is large enough, additional sand handling systems may be present and configurable to operate with additional wells.

Process of Automated Sand Handling

In another embodiment the inventions pertain to methods of automated sand separation. Such methods may include first providing flowback from an oil and gas well through a series of one, two, and/or three or more sand separators. The separators may be the same or different from those described above. Often one or more or even all the separators are operably connected to a programmable controller wherein each sand separator is operably connected to the same or different inlets of a common dumping vessel as described above. The dumping vessel may comprise a sensor to measure an amount of sand in the dumping vessel and the sensor may be operably connected to a programmable controller to instruct the dumping vessel to automatically dump when a specified amount of sand is detected in the dumping vessel.

A portion of said flowback from said series of one, or two, or three or more sand separators may be provided to the inlet of the dumping vessel. In addition, the flow of the flowback through the series of one, two, or three or more sand separators may be controlled to the inlet of the dumping vessel with the programmable controller. The programmable controller may be arranged to dump the vessel when a specified amount of sand is in the vessel. Typically, as described above the sensor measures the volume, weight, or both of sand in the dumping vessel.

Specific Embodiments

Figure 1:
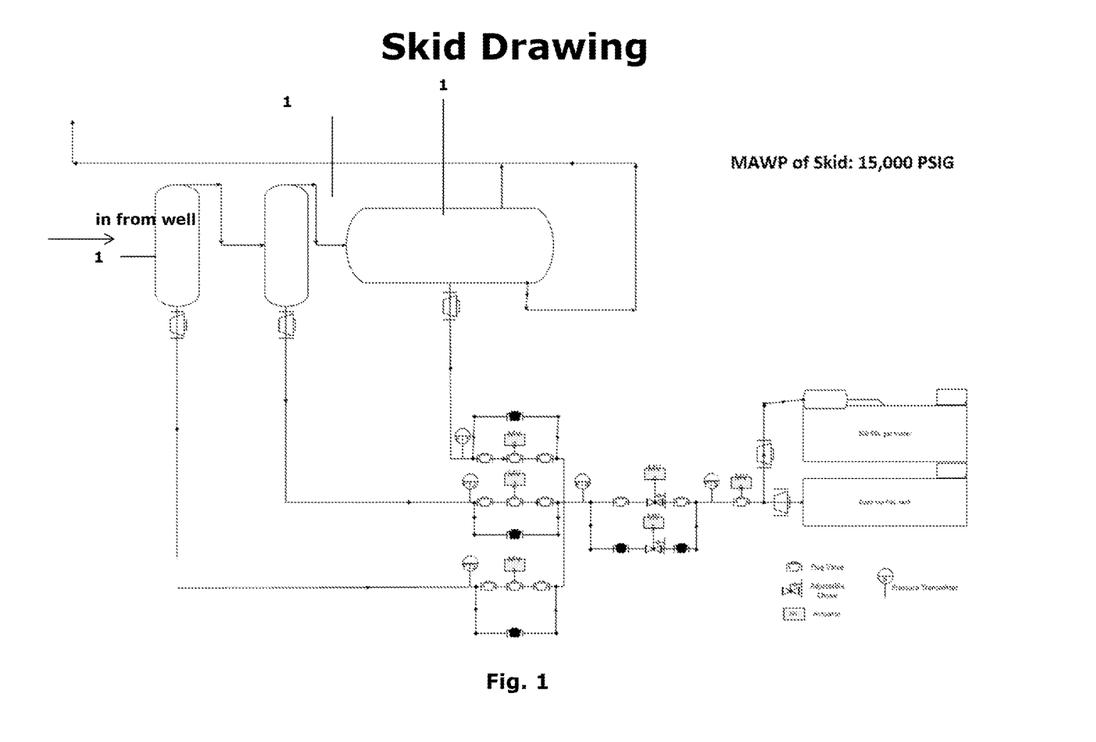
FIG. 1 shows three sand separators connected in series connected to one well and one dumping vessel over a frac tank.

FIG. 1 shows an exemplary embodiment. FIG. 1 comprises three sand separators 1 each that may be a gravity or a centrifugal separator connected to a well with valves, pressure transmitters, and/or chokes. Typically, the sand separators are not on the skid or mobile trailer and neither is the automated dumping device which is usually above the frac tank. As shown in FIG. 1 there may be: 3—Electric actuated valves, one per vessel, MV1-MV3; 2—Electric actuated chokes in parallel located downstream of the chokes, MV4 & MV5; 1—Electric actuated valves downstream of the chokes, MV6; 3—Pressure transmitters located upstream of the vessel valves, PT1-PT3; 1—Pressure transmitter located upstream of the of the 2 Electric actuated chokes in parallel, PT4; 1—Pressure transmitter located downstream of the of the 2 Electric actuated chokes in parallel, PT5; 1—level transmitter for the frac tanks; 1—Hand off Automatic Switch for the train; 1—Hand off Automatic Switch for the Sand dumping and measurement device; 1—Choke Select; 1—Reset Button; 1—Current Sensor; and a Sand dumping and measurement device.

Figure 2:
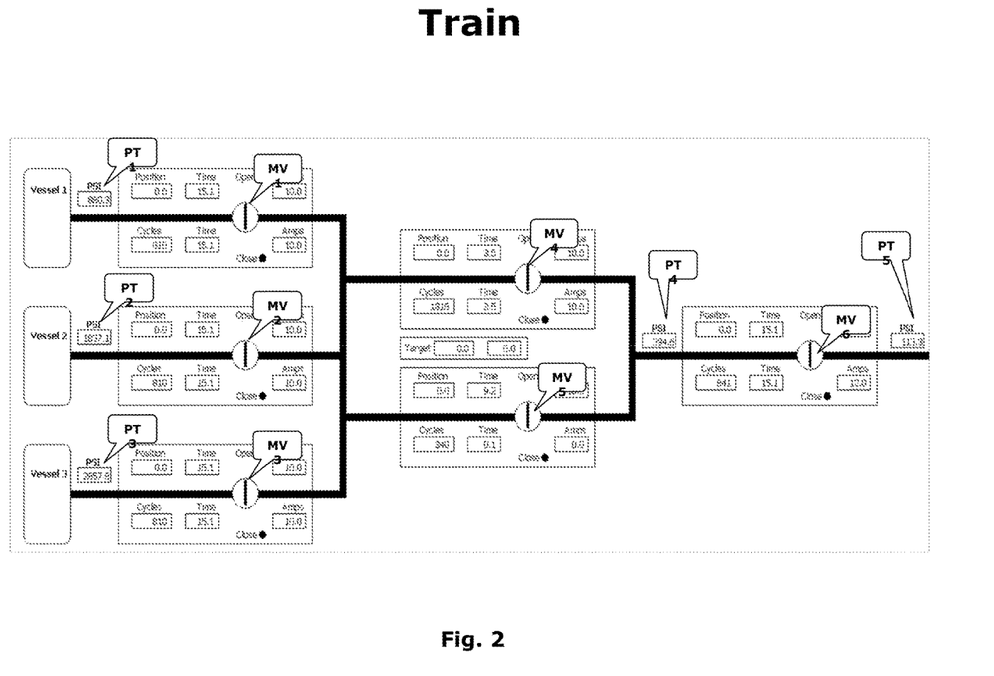
FIG. 2 shows an exemplary screen shot of an operator's screen for an automated sand dumping system.

FIG. 2 shows an exemplary screen shot of an operator's screen that is connected to the programmable controller. As depicted an exemplary configuration for one train is shown that comprises a well, three sand separators in series, and a dumping vessel.

Figure 3:
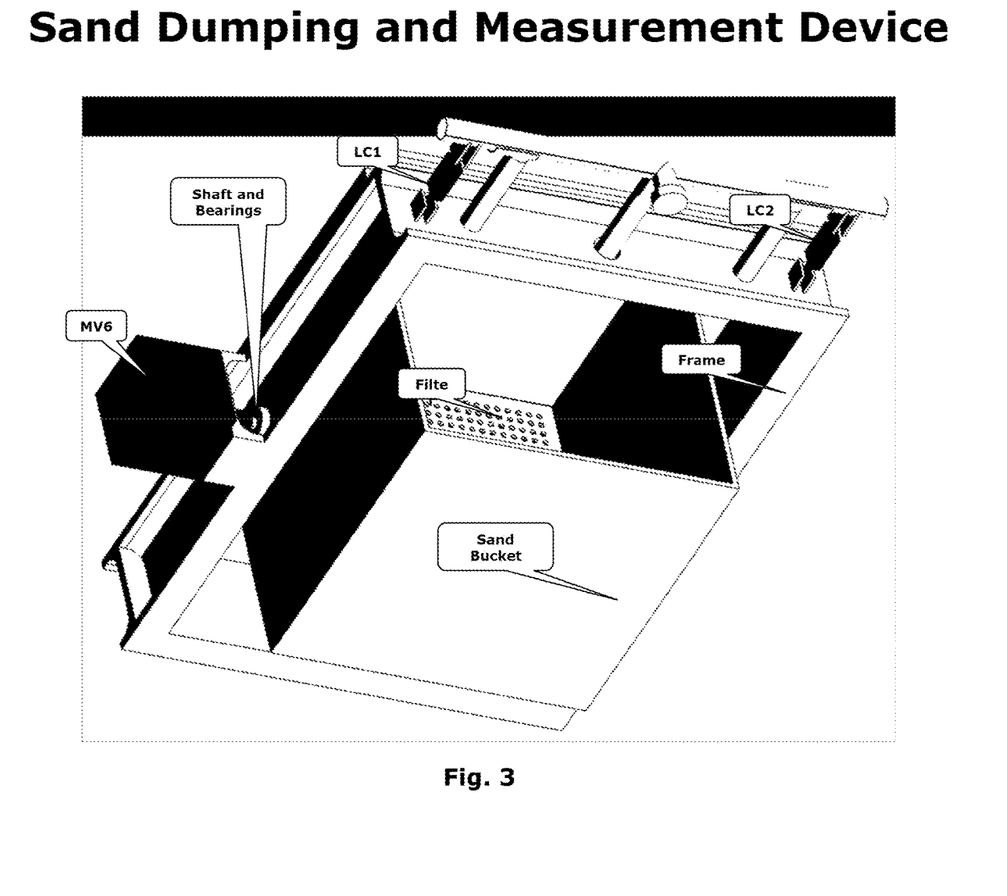
FIG. 3 shows a dumping vessel with associated load cells and actuator for automated dumping.

FIG. 3 shows a dumping vessel with associated load cells LC1 and LC2 with an electric actuated valve MV6 and associated shaft and bearings for automatically dumping the vessel upon receipt of a signal from the programmable controller or from the sensor that a specified amount of sand is in the vessel.

Figure 4:
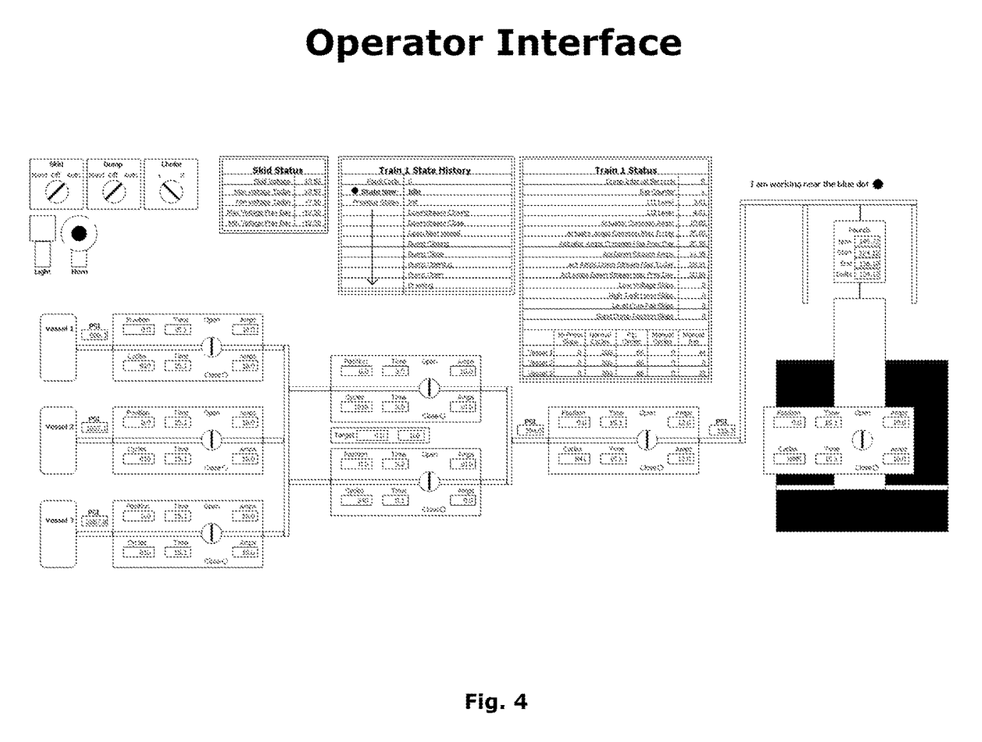
FIG. 4 shows an exemplary operator interface with the programmable controller.
Figure 5:
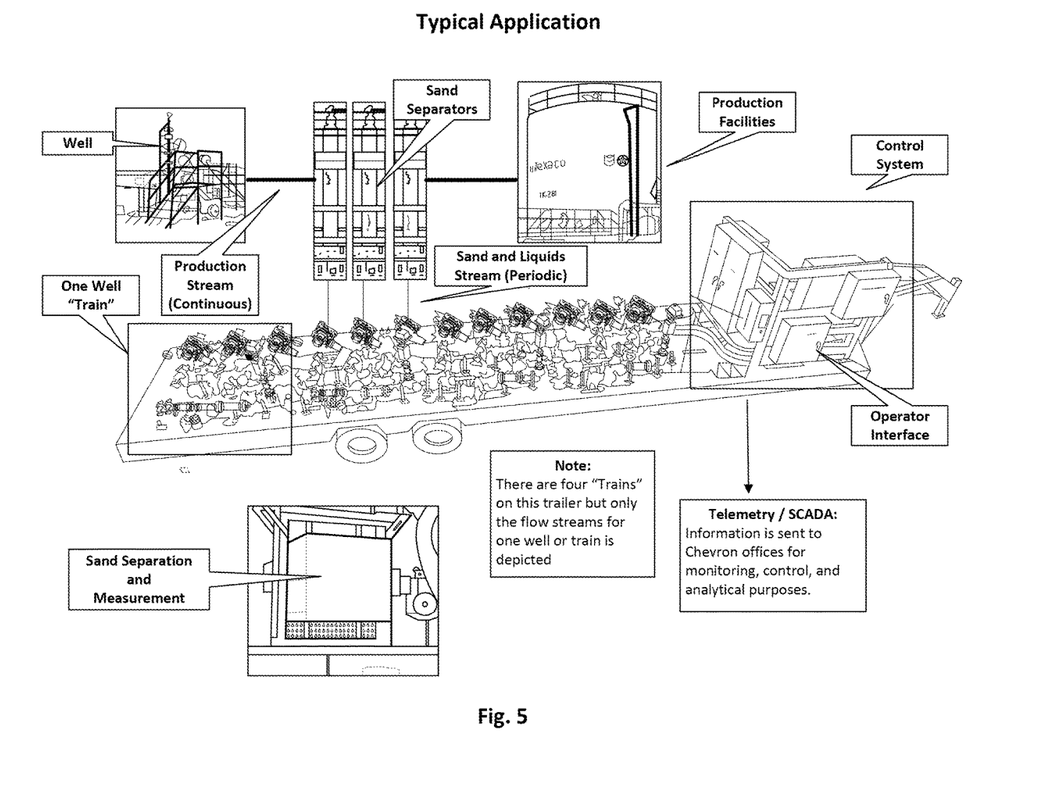
FIG. 5 shows a typical application for an automated sand handling system.

An exemplary operator interface is shown in FIG. 4 while a typical application is shown in FIG. 5 with the programmable controller and operator interface located on a mobile trailer with valves, chokes and other equipment for automated sand handling of one to three wells.

With respect to FIGS. 1 to 5 there is typically a common control system comprising the following: 1—PLC—Logic Solver, 1—Audio Warning, 1—Visual Warning, 1—Radio system, 1—Voltage Sensor, Battery bank, and Charging system.

Each Train may have three sand separators connected in series with the following instrumentation and controls: 3—Electric actuated valves, one per vessel, MV1-MV3; 2—Electric actuated chokes in parallel located downstream of the chokes, MV4 & MV5; 1—Electric actuated valves downstream of the chokes, MV6; 3—Pressure transmitters located upstream of the vessel valves, PT1-PT3; 1—Pressure transmitter located upstream of the of the 2 Electric actuated chokes in parallel, PT4; 1—Pressure transmitter located downstream of the of the 2 Electric actuated chokes in parallel; 1—level transmitter for the frac tanks; 1—Hand off Automatic Switch for the train; 1—Hand off Automatic Switch for the Sand dumping and measurement device; 1—Choke Select; 1—Reset Button; 1—Current Sensor; and a sand dumping vessel and sensor.

Each electric actuator may have, for example, the following IO:
Open Out
Close Out
Open Status In
Close Status In
Position In The dumping vessel with sensor may comprise a frame that supports the apparatus, 2—load cells that measure the weight of the sand in the dumping vessel; and the vessel itself that is configured to capture the flowback stream from the sand separators with connected valves and/or chokes.

Representative setpoints and data of a system may include, for example,
Setpoints:
Minimum operating voltage
Minimum dumping voltage
Selected choke in operation (MV4 or MV5)
Level shutdown for the frac tanks
Maximum downstream pressure alarm
Dump Interval: The time between dumping all vessels
Leak check time
Leak check pressure rise
Choke max open time (position failure)
For each vessel, the following setpoints:
    Normal Dump Time: The amount of from choke begin to open until choke begin to close.
    Normal Dump Choke Position: The choke position during a normal dump cycle
    Normal Dump Pressure: The system will not dump if vessel pressure is over this setpoint.
    Rip Dump Time: The amount of from choke begin to open until choke begin to close.
    Rip Dump Choke Position: The choke position during a normal dump cycle
    Rip Dump Pressure: The system will not dump if vessel pressure is over this setpoint.
For each actuator
    Travel time from full closed to full open
    Maximum allowed current (not including locked rotor)
Data:
Normal Dump: success dump counter for each vessel
Normal Dump: failed dump counter for each vessel
Normal Dump last successful dump time for each vessel
Normal Dump last failed dump time for each vessel
Rip Dump: success dump counter for each vessel
Rip Dump: failed dump counter for each vessel
Rip Dump last successful dump time for each vessel
Rip Dump last failed dump time for each vessel
Failure alarms for the actuators
Trend data for each dump cycle
Maximum operating current per actuator
Last operating current per actuator A representative valve sequence may be as follows:
Valve Sequence: The sequence of operations is the same for normal and rip cycles with the only difference being which individual separator valve is opened.
1. Turn on the warning audio and visual indicators
2. Wait for n seconds
3. Turn off the audio indicator
4. Open the downstream valve and monitor current. If the valve fails to open or maximum current is exceeded, shutdown train.
5. Get beginning weight of sand bucket
6. Open the Individual separator valve and monitor current. If the valve fails to open or maximum current is exceeded, shutdown train
7. Open Choke
8. While choke opening:
    a. If choke reaches position stop
    b. If choke reaches max open time stop
    c. If maximum current is exceeded shutdown train.
    d. If dump time expires end while
9. Close choke. If choke fails to close ESD Skid
10. Close the individual separator valve. If the valve fails to close, ESD Skid.
11. Wait for drain timer to expire. This gives time for water to separate from sand
12. Get ending weight
13. Calculate sand production for this vessel and total sand production for well
14. Close the downstream valve. If the valve fails to close, ESD Skid
15. Turn off the visual indicator
16. Wait programmed amount of time A system may be in automatic operation or manual operation as, for example, as follows:
Automatic Operation:
The system will monitor the other skids, the high-level signal from the frac tanks, and the dump interval timer. When the system is ready to dump, the following will occur:
    The system will turn on the dumping output so other skids won't dump
    The system will dump vessels 1, 2, and 3 in order, performing the following actions
        The system will decide if this is a rip cycle or normal cycle.
        i. Rip Cycle: The system will check the vessel pressure against the Maximum Rip Pressure.
            1. If the pressure is ok the system will execute the valve sequence above with rip choke position.
            2. If the pressure is above the Maximum Rip Pressure, a rip cycle is prevented and the system will attempt to execute a normal dump cycle below. Note: since the rip cycle was skipped, the system will attempt to execute the rip cycle every cycle after this until it is successfully executed.
        ii. Normal Dump Cycle: The system will check the vessel pressure against the Maximum Dump Pressure: If the pressure is above the Maximum Dump Pressure this vessel will be skipped this cycle and the interval timer will be restarted. If the pressure is ok the system will execute the valve sequence above with the normal choke position.
    The system will turn off the dumping output so other skids can dump Manual Operation:
The operator will move the selector to manual mode
The operator will press and hold the button associated with the desired operation for 5 seconds
The system will monitor the other skids, the high-level signal from the frac tanks. If it is ok to dump the system will execute a rip or normal dump cycle just like the automatic mode above.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. A sand handling system comprising:
a sand separator operatively connected to a well and an inlet of a dumping vessel remotely located from the sand separator;
a valve between the sand separator and the inlet of the dumping vessel;
a sensor to measure an amount of sand in the dumping vessel; and
a choke valve located between the valve and the inlet of the dumping vessel;
a programmable controller arranged to open and close the valve, arranged to open, close, and throttle the choke valve, and arranged to dump the dumping vessel when a specified amount of sand is in the dumping vessel; and
wherein at least a portion of the system is mounted on a skid or on a mobile trailer and wherein the skid or mobile trailer is located remotely from the sand separator and the well.

2. The system of claim 1 wherein the sand separator is a gravity separator.

3. The system of claim 1 wherein the sand separator is a centrifugal separator.

4. The system of claim 1 which further comprises a second sand separator operatively connected to the well and an inlet of the dumping vessel;
a second valve between the second sand separator and the inlet of the dumping vessel;
wherein the programmable controller is arranged to open and close the second valve.

5. The system of claim 4 which further comprises a third sand separator operatively connected to the well and the inlet of the dumping vessel;
a third valve between the third sand separator and the inlet of the dumping vessel;
wherein the programmable controller is arranged to open and close the third valve.

6. The system of claim 1 wherein the sensor measures the volume of sand in the dumping vessel.

7. The system of claim 1 wherein the sensor measures the weight of the sand in the dumping vessel.

8. The system of claim 7 wherein the sensor comprises a scale.

9. The system of claim 7 wherein the sensor comprises a load cell.

10. The system of claim 1 wherein the system is configured to track one or more parameters selected from the group consisting of sand production over time, total weight of sand dumped, total volume of sand dumped, sand production by each sand separator, flowback rates, flowback volumes, well test, oil amount, water amount, gas amount, well casing pressure, intermediate casing pressure, tubing pressure, flow line pressure, and combinations thereof.

11. The system of claim 1 wherein the skid or mobile trailer comprises the valve, the choke valve, and the programmable controller.

12. A mobile trailer comprising:
two or more sand handling systems wherein a first sand handling system is configurable to operate with a first well, three sand separators, and a first dumping vessel comprising a first sensor to measure an amount of sand in the first dumping vessel and wherein a second sand handling system is configurable to operate with a second well, three different sand separators, and a second dumping vessel comprising a second sensor to measure an amount of sand in the second dumping vessel;
a programmable controller configured to dump the first dumping vessel when a specified amount of sand is in the first dumping vessel and configured to dump the second dumping vessel when a specified amount of sand is in the second dumping vessel;
wherein each of the first and second sand handling system comprises:
three valves wherein each valve is configurable to be associated with a different sand separator and wherein each valve is operably connected to be controlled by the programmable controller; and wherein the mobile trailer comprising two or more sand handling systems is located remotely from the first well, the second well, the three sand separators, and the three different sand separators.

13. The mobile trailer of claim 12 further comprising a choke operably connected to be controlled by the programmable controller.

14. The mobile trailer of claim 12 further comprising a third sand handling system configurable to operate with a third well.

15. The mobile trailer of claim 14 further comprising a fourth sand handling system configurable to operate with a fourth well.

16. The system of claim 12 wherein the mobile trailer comprises the three valves wherein each valve is configurable to be associated with a different sand separator and the programmable controller.

17. A method of automated sand separation comprising:
providing flowback from an oil and gas well through a series of three sand separators operably connected to a programmable controller wherein the three sand separators are operably connected to an inlet of a dumping vessel wherein the dumping vessel comprises a sensor to measure an amount of sand in the dumping vessel and wherein said sensor is operably connected to a programmable controller;
providing at least a portion of said flowback from said series of three sand separators to the inlet of the dumping vessel; and
controlling the flow of the flowback through the series of three sand separators and to the inlet of the dumping vessel with the programmable controller wherein the programmable controller is arranged to dump the dumping vessel when a specified amount of sand is in the dumping vessel and wherein the programmable controller is mounted on a skid or on a mobile trailer and wherein the skid or mobile trailer is located remotely from the series of three separator, the dumping vessel, and the well.

18. The method of claim 17 wherein the sensor measures the volume of sand in the dumping vessel.

19. The method of claim 17 wherein the sensor measures the weight of the sand in the dumping vessel.

* * * * *